US005798252A

United States Patent [19]

Hobson et al.

[11] Patent Number: 5,798,252
[45] Date of Patent: Aug. 25, 1998

[54] ENCAPSULATED PRODUCT CONTAINING ESSENTIAL OIL AND DYED MICROBIAL CELL WALL MATERIAL

[75] Inventors: John Charles Hobson, Staffordshire; Roderick Norman Greenshields, Swansea, both of United Kingdom

[73] Assignee: CPC International Inc., Englewood Cliffs, N.J.

[21] Appl. No.: 647,489

[22] Filed: May 14, 1996

[30] Foreign Application Priority Data

May 17, 1995 [GB] United Kingdom ............ 9509937

[51] Int. Cl.[6] ............... C12N 1/00; C12N 1/16; C12N 1/18; A23L 1/27
[52] U.S. Cl. ............... 435/243; 426/262; 435/255.1; 435/255.2
[58] Field of Search ............... 435/174, 243, 435/252.1, 254.1, 255.1, 255.2; 426/262

[56] References Cited

U.S. PATENT DOCUMENTS 5,545,557  8/1996  Hobson et al. ............ 435/255.1

FOREIGN PATENT DOCUMENTS 0085805  4/1983  European Pat. Off.
0242135  10/1987  European Pat. Off.
2162147  1/1986  United Kingdom.

OTHER PUBLICATIONS

Database WPI Section Ch, Week 9251.
Derwent Publications Ltd., London, GB, Class G 02, AN 92–419002 JP, A, 04 313 341 (Mitsubishi Paper Mills, Ltd.) 5 Nov. 1992.
Derwent AN 95–174891, JP-A-7096163, Apr. 11, 1995.

*Primary Examiner*—David M. Naff

[57] ABSTRACT

An encapsulated product is provided containing a substance such as essential oil used in flavors and fragrances encapsulated in dyed cell wall-derived material such as from a fungus. The encapsulated product can be produced by contacting a microbial cell having an intact cell wall and which is preferably alive with the substance to be encapsulated, allowing the substance to diffuse through the cell wall into the microbial cell to encapsulate the substance and contacting the microbial cell with a dye to adsorb the dye to the surface of the cell wall to give a visible color to the cell wall. Alternatively, the microbial cell wall can be dyed before the microbial cell is contacted with the substance to be encapsulated. The cell wall can be dyed with a color associated with a naturally occurring source from which the substance encapsulated is obtained. For example, when the substance is lemon oil, the cell wall is dyed yellow. The encapsulated substance may be released from the microbial cell by chemical biodegradation or mechanical rupture of the cell wall. The encapsulated product can be used in foodstuffs to provide color and flavor, or for other uses where microcapsules are conventionally used.

18 Claims, No Drawings

ENCAPSULATED PRODUCT CONTAINING ESSENTIAL OIL AND DYED MICROBIAL CELL WALL MATERIAL

FIELD OF THE INVENTION

This invention relates to an encapsulated product and to a process for its production.

BACKGROUND OF THE INVENTION

It is known that substances may be encapsulated within the cell walls of microorganisms. For example, Pennell, et al., EP-A-0085805 discloses a process for encapsulating substances which comprises treating a microbe with an organic lipid-extending substance such that the substance is absorbed by the lipid and is retained passively in the microbe. The method described in this document is said to be particularly suitable for producing encapsulated dyes for use in, for example, carbonless copying paper. It will be appreciated that an important requirement for this end use is that the dye must not be visible in the intact product so that a change in colour may be observed on rupturing the capsules to release the dye.

Microbial encapsulation is also disclosed in EP-A-0242135 and this document teaches that an encapsulated material may be obtained by contacting the material with a microbe which has a lipid content significantly less than 40% by weight. This document discloses the encapsulation of essential oils used in flavours or fragrances and, as in EP-A-0085805, the encapsulation of dyes. Again, however, it is essential that the colour of the dye should become visible only when the capsules are ruptured. There is no mention in this document that dyes and essential oils may be encapsulated together.

SUMMARY OF THE INVENTION

The present invention provides an improved encapsulated material which involves the use of microbial cell walls for encapsulation but which allows a colour to be seen in the intact (i.e., unruptured) bulk product.

DETAILED DESCRIPTION OF THE INVENTION

Accordingly, the present invention provides an encapsulated product comprising a shell of microbial cell wall-derived material and a substance encapsulated within the shell, wherein the material is dyed to give a colour which is visible in the bulk product. The substance is one which does not occur naturally in the microbe in any significant amount.

The term "microbial cell wall-derived material", as used herein, is intended to cover microbial cell wall material as it occurs in the live or dead cell and microbial cell wall material that has been physically or chemically modified. Possible modifications of the cell wall material are known and include treatment to soften it in order to facilitate subsequent release of encapsulated material, such as by treatment with a proteolytic enzyme or an alkali, and treatment to harden it in order to prevent premature liberation of the encapsulated material, such as by treatment with a dilute aqueous aldehyde solution.

The shell of microbial cell wall-derived material is preferably complete and continuous but it may also be incomplete (i.e., it may contain one or more apertures) and this may be desirable for some applications.

The microbe from which the microbial cell wall-derived material is obtained may be a fungus, bacterium or alga. Preferably, the microbe is a fungus. Suitable fungi include the yeasts *Kluyveromyces fragilis* (dairy yeast), *Candida utilis* and filamentous fungi such as *Aspergillus niger* but, as a result of its availability and effectiveness in the invention, the preferred fungus for use in the present invention is *Saccharomyces cerevisiae* (brewer's yeast and baker's yeast).

The substance which is encapsulated in the product of the invention may be a pure substance, a mixture or it may be a solution of the substance or the mixture in a solvent. The solvent should not be miscible with the microbial lipid and suitable solvents therefore include the lower alcohols such as methanol, ethanol and isopropanol. The substance is conveniently a liquid at room temperature.

Examples of substances which may be encapsulated in accordance with the invention are benzaldehyde and essential oils used in flavours or fragrances (such as lemon, garlic, clove, mint, peppermint, lavender, cedar, cheese and eucalyptus oils), pheromones (such as *Dacus oleae*, Z-11-hexadecenal and 2,9-DDA), insecticides (such as organophosphorus compounds, e.g., malathion and Diazinon), leuco dyes (for instance sudan blue, sudan black and crystal violet lactone), vitamins (such as Vitamins A and C), drugs (such as menthol), detergents (such as lauryl ether sulphate), rodenticides (such as alphachloralose), nematocides (such as dichlorophen), insect-repellents (such as onion extract), herbicides, fungicides, molluscicides, insect-and plant-growth regulators, water-soluble materials such as food colourants (e.g., cochineal), and oil of wintergreen. Preferably, the substance comprises an essential oil used in flavours or fragrances. It is also preferred that the material is dyed to give it a colour which is associated with the naturally occurring source from which the essential oil may be obtained e.g., the substance is lemon oil and the material is dyed yellow or the substance is lavendar oil and the material is dyed lilac.

The dyes which may be used in the present invention are any naturally occurring or synthetic colouring agents that can be taken up by the microbial cell-wall derived material so that a colour is visible in the bulk intact product i.e., before the product is ruptured. Provided that this requirement is met, the dye may be taken up by and/or absorbed on the surface of and/or encapsulated within the cell wall-derived material. Preferably, however, the dye is taken up by the cell wall-derived material. The dyes may also be visible when the product is ruptured although if a second dye is encapsulated in the product, a colour change may be observed on rupturing.

Suitable naturally occurring dyes and methods for dyeing cell ghosts are described in EP-A-0566347. The methods disclosed in this document have been found to be applicable in the present invention for dyeing the microbial cell wall-derived material. Examples of the naturally occurring dyes which may be used are turmeric and annatto. Many synthetic dyes may also be used in the present invention such as, for example, azo-dyes. Of course, for sure applications of the product it will be important that the dyes are suitable for food use.

The present invention also provides a process for producing the product of the invention.

In one embodiment, the process comprises treating a grown intact microbe by contact with an encapsulatable substance in liquid form which is capable of diffusing into the microbial cell without causing total lysation thereof and dyeing the treated microbe by contact with a dye.

Dyes which are non-toxic to the microbes may be used to colour the microbes before the diffusion of the encapsulatable substance into the cell. Therefore, in another embodiment, the process of the invention comprises dyeing a grown intact microbe and treating the dyed microbe by contact with an encapsulatable substance in liquid form which is capable of diffusing into the cell without causing total lysation thereof. Surprisingly, this process gives better results in terms of oil encapsulation and dyeing than the process above i.e., that involving encapsulation followed by dyeing.

In either embodiment of the process of the invention, the microbe is preferably live at least at the commencement of the process. Also, treatment of the microbe advantageously comprises mixing the microbe with an encapsulatable substance in an aqueous medium by, for example, adding the encapsulatable substance in liquid form to a slurry of the microbes in water. The treatment is preferably carried out at a temperature of from 20° C. to 60° C. at least during the initial stage of the treatment and, desirably, is performed for a time until the desired optimum amount of one or more globules of the substance can be observed microscopically within the microbial cell.

Following treatment to encapsulate the substance and/or to dye the material, the treated and/or dyed microbes may be separated from the liquid (e.g., by centrifugation) and dried (e.g., by freeze-drying or spray-drying).

The dyeing step of the process of the invention preferably comprises the addition of the dye, as a liquid or a solution, to a stirred mixture of the treated or untreated microbes in an aqueous liquid, and separating the dyed microbes from the resulting mixture. The aqueous liquid is preferably water but it may contain organic solvents such as lower alcohols (e.g., ethanol) and its pH may be adjusted, depending on the nature of the dye, to optimise the dyeing of the microbes.

For use in the invention, the microbe should be in grown form and must be intact i.e., not lysed. As mentioned above, the microbe may be alive, at least at the commencement of the treatment; however, the microbe may have been subjected to conditions (such as by irradiation of the microbe) to destroy its ability to propagate.

It is not necessary for the microbe to have a significant lipid content. Typically, the lipid content may be not more than about 5%, for example up to 3%, of the dry weight of the microbe. The microbes may, however, be treated with lipid-extending substances to increase the lipid content of the microbe, as taught in, for example, EP-A-0085805.

After encapsulation and/or dyeing, the microbial capsule may be treated to soften it in order to facilitate subsequent release of the encapsulated substance, such as by treatment with a proteolytic enzyme or an alkali, or it may be treated to harden it in order to prevent premature liberation of the encapsulated substance, such as by treatment with a dilute aqueous aldehyde solution.

Usually the microbe will be killed as a result of the encapsulation.

The encapsulated substance may be released from the microbial capsules when desired by, for instance, chemical biodegradation or mechanical rupture of the microbial cell wall, or by subjecting the capsules to an environment in which the substance diffuses gradually out through the pores in the microbial cell wall. Thus, the product of the invention allows the substance to be retained within the microbial capsules, identifiable by their colour, until its release by biodegradation, rupture, or diffusion.

The product of the invention may be employed in any application for which known microcapsules are conventionally used either as a free-standing product or adhered to a substrate. Suitable applications include, for example, use in foodstuffs to give a delayed release of flavour when the foodstuff is eaten, in striped toothpaste to immobilise a given flavour in a coloured stripe, in confectionery, in personal hygiene products, in the advertising of perfumes by providing small samples of microcapsules adhered to paper, in copying paper and in tamper-evident applications where a colour or odour produced on rupturing the product indicates tampering.

The invention is illustrated by the following Examples.

EXAMPLE 1

(a) Dyeing Live Yeast

Live baker's yeast from Gist-Brocades-British Fermentation Products Limited (7 kg) was made up into a slurry with 10% aqueous ethanol 1 l) and the pH adjusted to 3.0 with concentrated hydrochloric acid. Turmeric oil (5 ml) was gradually added to the mixture with continuous stirring. The yeast became bright yellow in colour but was left stirring for 2 hours before possible further additions. Further turmeric oil (12 ml) could be added before the oil started to show in excess. The mixture was then left to stir overnight. The resulting coloured yeast was centrifuged (2,500 rpm for 15 minutes) and washed four times with warm water.

A sample of the coloured yeast was taken for microbiological examination and for growth on malt extract agar and liquid malt extract at 30° C. Live yeast was observed under the microscope with only a few vacuoles while the slopes and the liquid medium grew well.

(b) Encapsulation in Coloured Yeast

A sample of the coloured yeast obtained in (a) (20 to 30 g based on dry weight of the yeast) was made up to a 15 to 20 w/v slurry with water. Lemon oil (6 g; 20% based on the dry weight of the yeast) was added with stirring gradually over a period of 4 hours at 30° C. The product was then centrifuged (2,500 rpm for 15 minutes), frozen and vacuum dried to give 29 g of a yellow powder with a lemon odour.

Microbiological examination of the product showed that many of the yeast cells contained large oil droplets similar to vacuoles. SUDAN III stain also indicated the presence of oil.

The degree of leaching of the colour from the product was determined by placing a small sample of the product on a filter paper. In this case, some leaching of the colour from the product to the filter paper was observed.

EXAMPLE 2

This example illustrates that yeasts other than baker's yeast may be used in the present invention.

(a) Dyeing Yeast 200 ml of an aqueous slurry of Pekin yeast (a strain of yeast used in gasohol production, obtained from the Pekin Fermentation Company, USA) having a dry weight of 36 g was used at its natural pH value of 4.45. Turmeric oil was added to the slurry with continuous stirring at 15° to 20° C. a few ml at a time until a bright yellow colour was obtained and a small amount of excess turmeric oil remained on the surface of the mixture. The mixture was centrifuged and the separated dyed yeast washed with cold water until no colour appeared in the washings.

(b) Encapsulation in Coloured Yeast 100 ml of the dyed yeast slurry obtained in step (a) above was stirred at 40° C. in a water bath and 5 ml lemon oil was added gradually. The mixture was maintained at this temperature, with stirring, overnight and was then centrifuged, washed with cold water in situ and freeze dried. Microscopic examination of the yeast showed that the oil had entered the yeast cells and occupied most of the cell.

Using the method described in Example 1, the degree of leaching of colour from the product was assessed. The product was found to hold its colour much more strongly than the product of Example 1.

EXAMPLE 3

This example was carried out to show that it is possible to encapsulate the oil in the yeast first and then dye the resulting product.

(a) Encapsulation in Yeast 300 ml of a slurry of Pekin yeast in water having a dry weight of 19.2% w/v was stirred at 40° C. and 10 ml lemon oil was gradually added. The mixture was left to stir overnight at 40° C. and the volume made up to 300 ml with water to compensate for losses due to evaporation.

(b) Dyeing Encapsulated Yeast 5 ml turmeric oil was added gradually to the mixture obtained in step (a). Examination by high power microscopy (×1000 magnification) showed that little oil had been taken up and, therefore, an additional 5 ml each of lemon oil and turmeric oil was added. After 4 hours further stirring, the mixture was centrifuged at 300 rpm for 10 minutes. This gave rise to a yellow yeast layer, a thickish supernatant (brown/yellow in colour) and a small amount of oil floating on top of the mixture. The yeast was washed with water and freeze dried.

The encapsulated product produced by this method was found to be acceptable but the method was considered to be slightly inferior to the method involving dyeing the yeast followed by encapsulation.

EXAMPLES 4 TO 10

Example 1 was repeated using the following dyes (all of which are synthetic) and oils:

| Dyes | Oils |
| --- | --- |
| FD & C Red No. 40 | Peppermint + |
| FD & C Red No. 1 | Peppermint |
| RIT Black (CPC International Inc) | Cheese Oil |

+ Product was pasteurised at 80° C. after encapsulation

In all cases an acceptable encapsulated product was obtained.

EXAMPLES 11 TO 14

Example 2 was repeated using the following dyes and oils:

| Dyes | Oils |
| --- | --- |
| FD & C Red No. 40 | Peppermint |
| FD & C Blue No. 1 | |
| RIT Black (CPC International Inc) | |

Again, in all cases a satisfactory product was produced.

EXAMPLE 15

The product of Example 1 was incorporated into a standard commercially available mayonnaise-type dressing at a level of about 1% by weight. A yellow colour was imparted to the dressing and a lemon flavour developed in the mouth when the product was tasted.

We claim:

1. Encapsulated product comprising a shell of microbial cell wall-derived material and an essential oil used in flavors and fragrances encapsulated within the shell, wherein said shell of microbial cell wall derived material is dyed with a dye which is adsorbed on the surface of said shell of microbial cell wall-derived material to give a visible color to said shell before said shell is ruptured.

2. The encapsulated product as claimed in claim 1, wherein the microbial cell wall-derived material is from a fungus.

3. The encapsulated product as claimed in claim 2, wherein the fungus is *Saccharomyces cerevisiae*.

4. The encapsulated product as claimed in claim 1, wherein said dyed shell of microbial cell wall-derived material has a color which is associated with the naturally occurring source from which said essential oil is obtained.

5. The encapsulated product as claimed in claim 4, wherein the essential oil is lemon oil and the shell is dyed yellow.

6. Foodstuff comprising the encapsulated product of claim 1.

7. Process for preparing an encapsulated product comprising contacting a microbial cell having an intact cell wall with an essential oil used in flavors and fragrances, allowing the essential oil to diffuse through the cell wall to become encapsulated by the cell wall within the microbial cell and dyeing the microbial cell wall by contacting the microbial cell with a dye whereby the dye is adsorbed to the surface of the cell wall.

8. The process as claimed in claim 7 wherein the microbial cell is alive during the encapsulation.

9. The process as claimed in claim 7, wherein said microbial cell is contacted with the essential oil in an aqueous medium.

10. The process as claimed in claim 7, wherein said contact with the essential oil is at a temperature in the range of from 20° C. to 60° C., at least during the initial stage of the contact.

11. The process as claimed in claim 7, wherein said contact with the essential oil is performed for a time until a desired optimum amount of one or more globules of the essential oil can be observed microscopically within the microbial cell.

12. The process as claimed in claim 7, wherein said dyeing comprises the addition of the dye to a stirred mixture of the microbial cell containing encapsulated essential oil in an aqueous liquid.

13. Process for preparing an encapsulated product comprising dyeing a microbial cell having an intact cell wall by contacting the microbial cell with a dye whereby the dye is adsorbed to the surface of the cell wall, and contacting the dyed microbial cell with an essential oil used in flavors and fragrances and allowing the essential oil to diffuse through the cell wall to become encapsulated by the cell wall within the microbial cell.

14. The process as claimed in claim 13 wherein the microbial cell is alive during the encapsulation.

15. The process as claimed in claim 13 wherein said microbial cell is contacted with the essential oil in an aqueous medium.

16. The process as claimed in claim 13 wherein said contact with the essential oil at a temperature in the range of from 20° C. to 60° C., at least during the initial stage of the contact.

17. The process as claimed in claim 13 wherein said contact with the essential oil is performed for a time until a desired optimum amount of one or more globules of the essential oil can be observed microscopically within the microbial cell.

18. The process as claimed in claim 13 wherein said dyeing comprises the addition of the dye to a stirred mixture of the microbial cell in an aqueous liquid.

* * * * *